(12) United States Patent
Motts et al.

(10) Patent No.: US 9,120,358 B2
(45) Date of Patent: Sep. 1, 2015

(54) HITCH BALL ANGLE SENSOR

(71) Applicant: Cequent Performance Products, Inc., Plymouth, MI (US)

(72) Inventors: Douglas R. Motts, Fort Wayne, IN (US); Chandrakumar Kulkarni, Battle Creek, MI (US); Fred Brickley, Battle Creek, MI (US)

(73) Assignee: Cequent Performance Products, Inc., Plymouth, MI (US)

( * ) Notice: Subject to any disclaimer, the term of this patent is extended or adjusted under 35 U.S.C. 154(b) by 0 days.

(21) Appl. No.: 14/109,427

(22) Filed: Dec. 17, 2013

(65) Prior Publication Data

US 2014/0103619 A1    Apr. 17, 2014

Related U.S. Application Data

(63) Continuation-in-part of application No. PCT/US2012/004273, filed on Jun. 5, 2012.

(60) Provisional application No. 61/498,335, filed on Jun. 17, 2011, provisional application No. 61/508,166, filed on Jul. 15, 2011.

(51) Int. Cl.
*B60D 1/06* (2006.01)
*B60D 1/30* (2006.01)
*B60D 1/62* (2006.01)

(52) U.S. Cl.
CPC .. *B60D 1/30* (2013.01); *B60D 1/06* (2013.01); *B60D 1/62* (2013.01)

(58) Field of Classification Search
CPC ............ B60D 1/06; B60D 1/30; B60D 1/305; B60D 1/34; B60D 1/62

USPC .................. 280/422, 448, 504, 511; 304/431, 304/686.1, 686.2, 686.3, 687; 73/1.75

See application file for complete search history.

(56) References Cited

U.S. PATENT DOCUMENTS

| | | | |
|---|---|---|---|
| 3,833,928 A | 9/1974 | Gavit et al. | 340/431 |
| 3,947,839 A | 3/1976 | Zigmant | 340/431 |
| 3,968,981 A | 7/1976 | Suarez | 280/511 |
| 4,522,421 A | 6/1985 | Vance | 280/511 |
| 5,085,452 A | 2/1992 | Janeiro | 280/511 |
| 5,290,057 A | 3/1994 | Pellerito | 280/507 |
| 5,743,549 A | 4/1998 | Jackson | 280/507 |
| 6,173,985 B1 | 1/2001 | Thomas | 280/511 |
| 6,956,468 B2 | 10/2005 | Lee et al. | 340/431 |
| 6,983,950 B2 | 1/2006 | McCoy et al. | 280/511 |
| 7,159,890 B2 | 1/2007 | Craig et al. | 280/511 |
| 8,393,632 B2 | 3/2013 | Vortmeyer et al. | 280/511 |
| 2001/0030410 A1 | 10/2001 | McCoige et al. | 280/511 |

(Continued)

FOREIGN PATENT DOCUMENTS

| | | | | |
|---|---|---|---|---|
| DE | 10334000 | 2/2005 | | B60D 1/30 |
| DE | 102010010242 A1 | 6/2011 | | B60D 1/58 |
| DE | 102010009986 A1 | 9/2011 | | B60D 1/00 |

(Continued)

*Primary Examiner* — Joseph Rocca
*Assistant Examiner* — Maurice Williams
(74) *Attorney, Agent, or Firm* — McDonald Hopkins LLC

(57) ABSTRACT

A hitch ball assembly includes a hitch ball supported on a housing, a bore within the hitch ball and housing, and a pin rotatable with respect to the hitch ball and housing. The pin is configured to engage a trailer coupler and rotate therewith. An angle sensor measures rotation of the pin to determine rotational movement of the trailer.

19 Claims, 15 Drawing Sheets

(56) References Cited

U.S. PATENT DOCUMENTS

| | | |
|---|---|---|
| 2007/0138763 A1 | 6/2007 | George ............ 280/507 |
| 2009/0198425 A1 | 8/2009 | Englert ............ 701/70 |
| 2011/0018231 A1 | 1/2011 | Collenberg ............ 280/448 |
| 2012/0112434 A1 | 5/2012 | Albers et al. ............ 280/507 |

FOREIGN PATENT DOCUMENTS

| | | | |
|---|---|---|---|
| DE | 102012002335 A1 | 10/2012 | ............ B60D 1/30 |
| EP | 236654 | 9/2013 | ............ B60D 1/06 |
| WO | WO 2011050796 | 5/2011 | ............ B60D 1/58 |

# HITCH BALL ANGLE SENSOR

CROSS-REFERENCE TO RELATED APPLICATIONS

This application is a continuation-in-part of PCT application No. PCT/US2012/0042731 entitled "HITCH BALL ANGLE SENSOR," filed on Jun. 15, 2012, which claims priority to U.S. Provisional Patent Application No. 61/498,335 entitled "HITCH BALL ANGLE SENSOR," filed on Jun. 17, 2011, and further claims priority to Provisional Patent Application No. 61/508,166 entitled "HITCH BALL ANGLE SENSOR," filed on Jul. 15, 2011, each of which are hereby incorporated by reference in their entirety.

FIELD OF INVENTION

The present invention generally relates to a sensor for determining the angle of a towed vehicle with respect to a towing vehicle.

BACKGROUND

The use of a ball joint trailer coupling comprising a hitch ball and cooperating socket assembly to tow a trailer behind a towing vehicle is generally known. Such ball joint couplings often comprise a hitch ball and corresponding hitch ball receiver. The ball joint coupling provides the necessary freedom of movement to allow a trailer to track smoothly behind the towing vehicle while also providing a dependable connection. One example of a hitch ball design is set forth in U.S. Pat. No. 6,983,950 to McCoy et al., which is hereby incorporated by reference in its entirety.

Towed vehicles, such as trailers, may experience turbulence and other forces that cause them to sway, fishtail or otherwise veer from the route directed from the towing vehicle. In particular, hitches such as ball joint hitches allow a large degree of travel and lateral movement of the towed vehicle with respect to the direction of the towing vehicle. Too much sway, however, may have dangerous and even catastrophic effects. For example, a fishtailing towed vehicle may tip or roll over.

To prevent such undesired effect it may be useful to monitor the direction of travel of the towed vehicle with respect to the towing vehicle. Accordingly, a sensor designed to monitor the angular direction of travel of a towed vehicle is needed.

SUMMARY

A hitch ball assembly is provided. The hitch ball assembly includes a hitch ball positioned on a housing and rotatable with respect to the housing. A shaft may be connected to the hitch ball and extend within a bore within the housing. An angle sensor is configured to sense the rotation of the shaft. The hitch ball may include a deformable material positioned about a portion of the hitch ball. The deformable material may be in the shape of a ring and may be any deformable material, such as rubber.

In an embodiment, the angle sensor of the hitch ball assembly may be positioned on the side of the housing. The housing may include an opening, approximately perpendicular with the bore, to provide communication between the angle sensor and the shaft. The shaft may include one or more magnets to interface with the sensor.

In an embodiment, the sensor may be a non-contact sensor, such as a magneto-resistive sensor. The sensor may have a resolution of at least 0.05 degrees. The sensor output may be utilized by components of a towing vehicle or towed vehicle to prevent unwanted conditions for the towing or towed vehicle.

In an embodiment, the hitch ball assembly includes a bore extending through the hitch ball and the housing. A pin may be positioned within the bore and rotatable with respect to the hitch ball and the housing. The pin may be configured to engage the trailer coupler and rotate therewith. A spring may be positioned within the bore to bias the pin toward the coupler.

BRIEF DESCRIPTION OF THE DRAWINGS

The operation of the invention may be better understood by reference to the detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
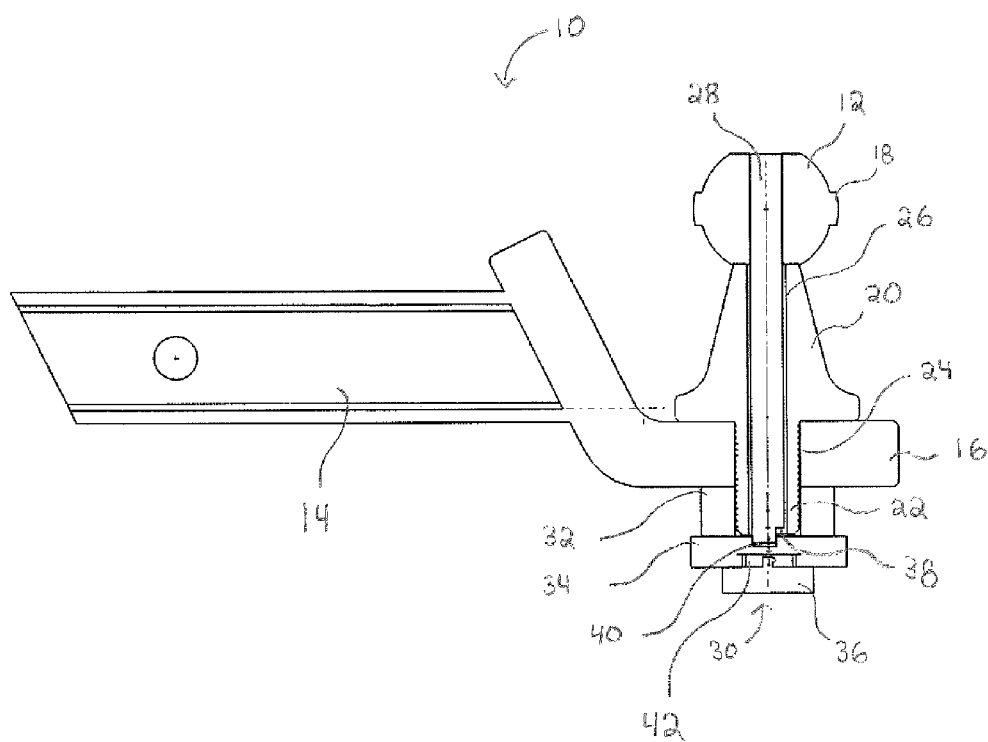
FIG. 1 is an embodiment of a hitch ball angle sensor.
Figure 2:
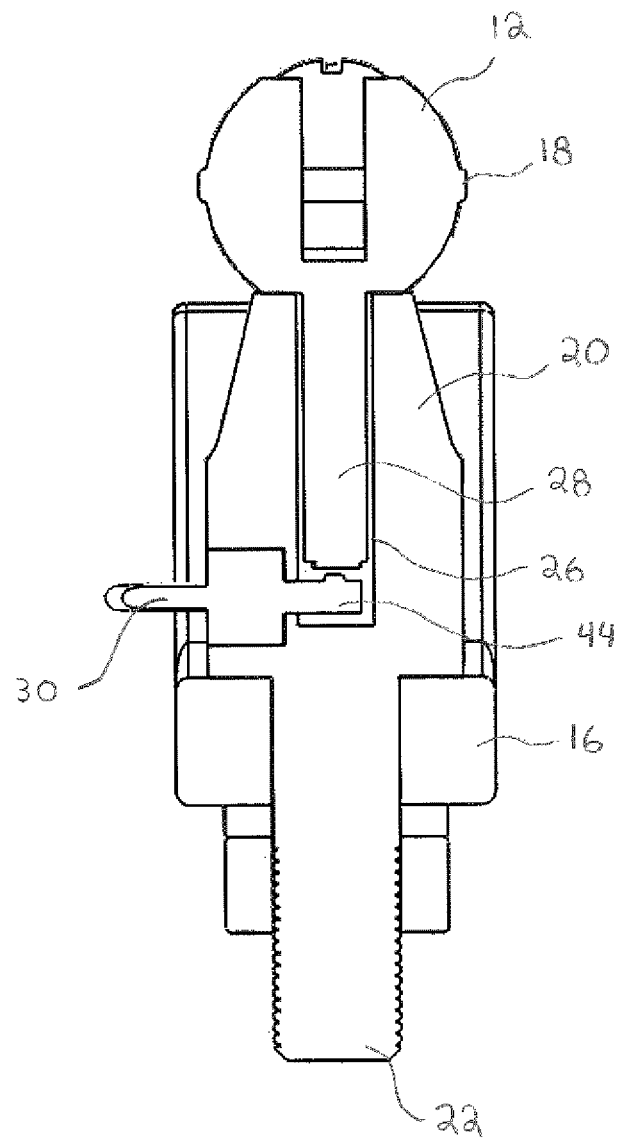
FIG. 2 is an embodiment of a hitch ball angle sensor.
Figure 3:
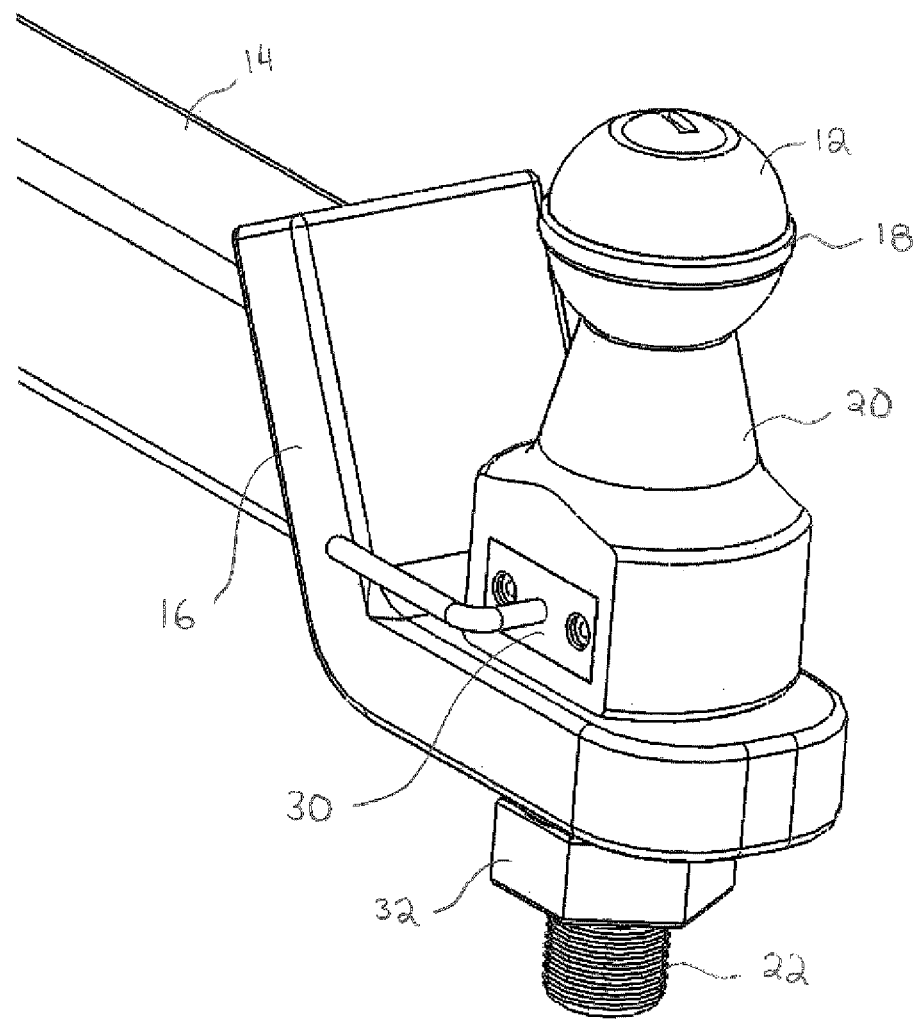
FIG. 3 is a perspective view of a hitch ball angle sensor.
Figure 4:
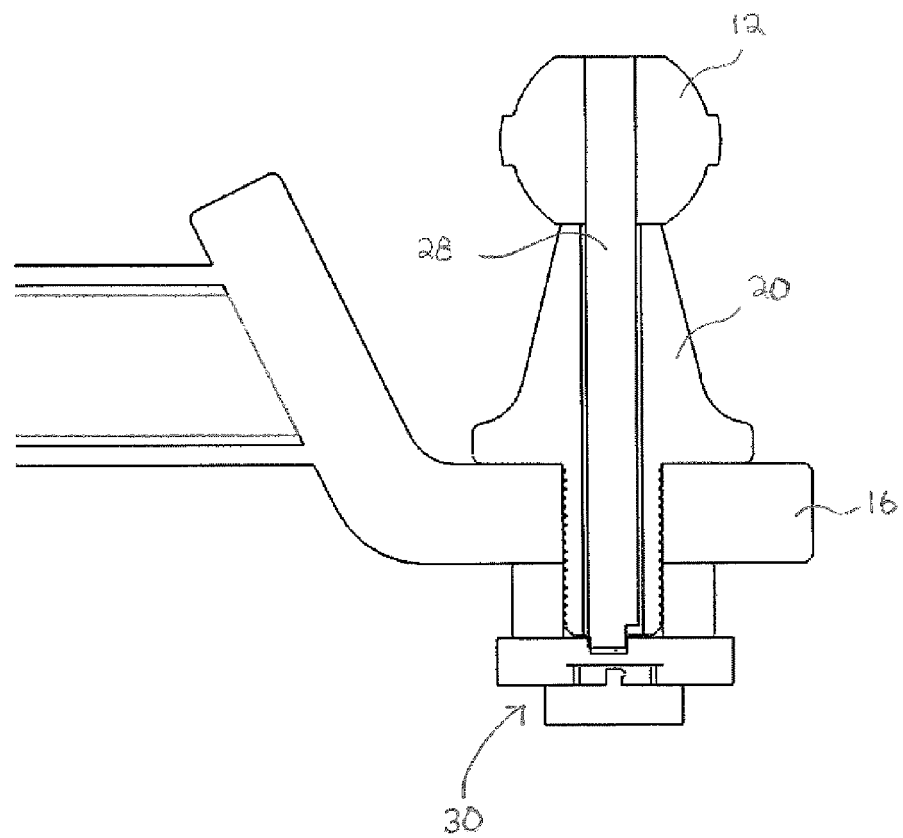
FIG. 4 is a labeled side view of a hitch ball angle sensor.
Figure 5:
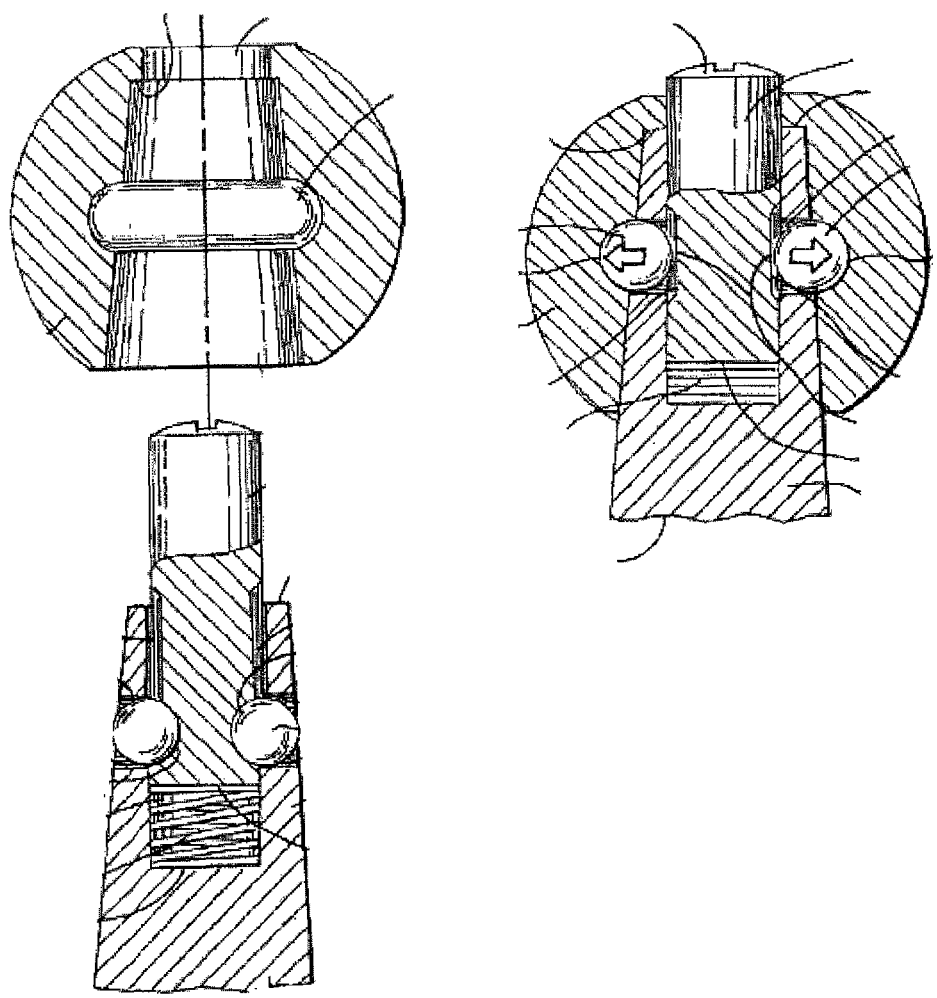
FIG. 5 is a hitch ball design.
Figure 6:
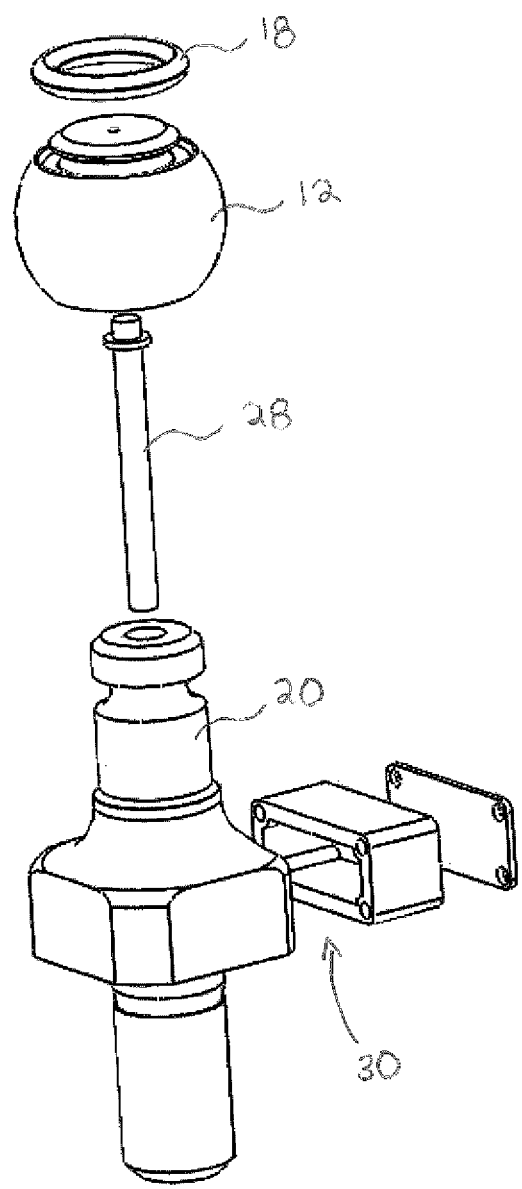
FIG. 6 is a perspective view of a hitch ball assembly having an angle sensor.
Figure 7:
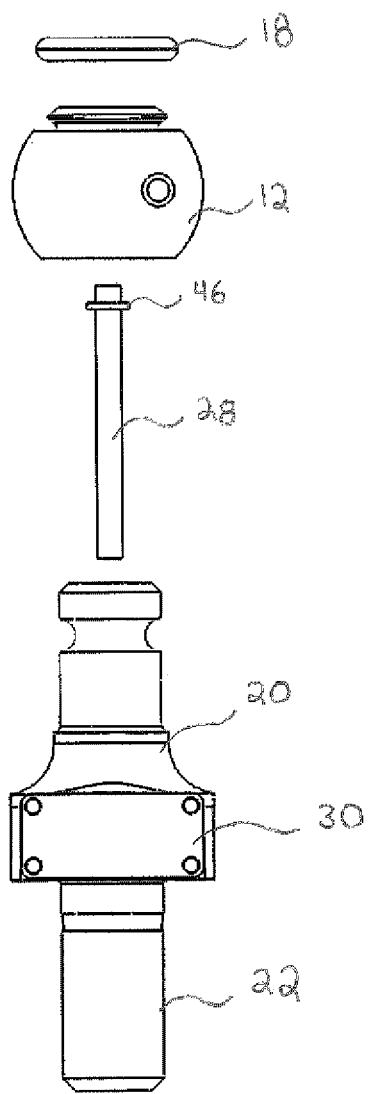
FIG. 7 is a side view of a hitch ball assembly having an angle sensor.
Figure 8:
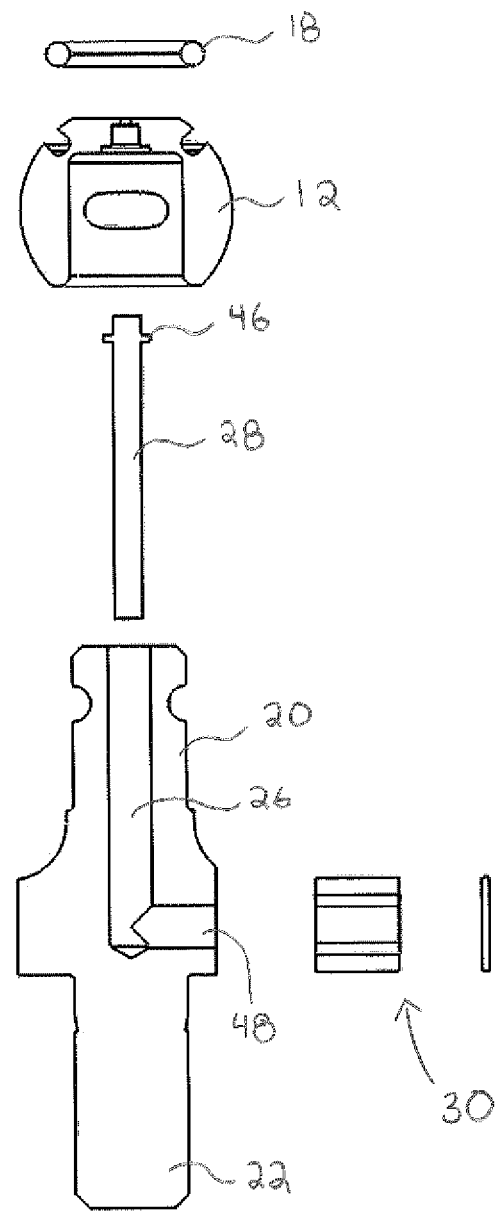
FIG. 8 is a cutaway view of a hitch ball assembly having an angle sensor.

A hitch ball assembly 10 having an angle sensor is generally provided, as illustrated in FIGS. 1-3. The hitch ball assembly 10 may include a hitch ball 12. The hitch ball 12 may be any appropriate size and shape, such as generally spherical. The hitch ball assembly 10 may be connected to a towing vehicle (not shown). For example, the hitch ball 12 may be directly or indirectly connected to a hitch bar 14, such as connected to a ball mount 16 that is carried on the hitch bar 14. The hitch bar 14 may be designed to connect to a hitch receiver on the towing vehicle.

The hitch ball 12 may be configured to engage a hitch ball coupler (not shown) on a towed vehicle to generally form a ball joint coupling between the towing vehicle and the towed vehicle. The coupler may include a generally spherically shaped opening to receive a similarly shaped hitch ball 12.

The hitch ball 12 may include a ring 18 positioned about at least a portion of the hitch ball 12. The ring 18 may be composed of a deformable material such as foam rubber or other similar materials. The deformable ring 18 may prevent slipping between the hitch ball 12 and corresponding coupler, thereby allowing the hitch ball to move or rotate with movement or rotation of the coupler, as is further described below. Alternatively, the hitch ball may include a frictional covering or surface treatment to prevent slipping between the coupler and the hitch ball 12. By utilizing a deformable ring 18, the hitch ball assembly may eliminate the need for additional parts, such as a key, that are designed to secure the engagement between the hitch ball and the coupler.

The hitch ball 12 may be supported by a ball shank or ball housing 20. The housing 20 may be any appropriate size and shape, such as generally conical, as illustrated in FIG. 1, or having a squared base and tapered upper portion, as illustrated in FIG. 2. The housing 20 may be connected to the ball mount 16. For example, the housing 20 may include a threaded bolt 22. The bolt 22 may be integrally formed with and extend from the bottom surface of the housing 20. The threaded portion may engage a similarly sized and threaded opening 24 in the ball mount 16. It will be appreciated, however, that the housing 20 may be connected to the ball mount 16 by any means known in the art.

The housing 20 may be configured to receive the hitch ball 12. For example, housing 20 may include a bore 26 positioned near the center of the housing 20. The bore 26 may extend through at least a portion of the housing 20. Alternatively, the bore 26 may extend completely through the housing 20. The hitch ball 12 may include or a shaft 28. The shaft 28 may be integrally formed with the hitch ball 12 or otherwise connected thereto, as described in further detail below. The shaft 28 may extend into the bore 26 as shown in FIGS. 1 and 2. The bore 26 may be sized and shaped to allow the shaft 28 to freely rotate therein. Accordingly, the housing may support the hitch ball 12 and shaft 28 and allow the hitch ball 12 and connected shaft 28 to rotate with respect to the housing 20 and bore 26.

The hitch ball assembly 10 may retain the shaft 28 within the bore 26 and prevent the ball from being removed from the housing 20. For example, as disclosed in U.S. Pat. No. 6,983,950 to McCoy et al, the housing may include one or more ball bearings positioned to engage a cavity in the shaft 28, thereby preventing removal of the shaft 28 from the bore 26 while still allowing rotation of the shaft 28 within the bore 26. The ball bearings may be spring loaded or otherwise biased to allow the hitch ball 12 and shaft 28 to be removed and interchanged as necessary and allow different hitch ball sizes to be selected. It will be appreciated, however, that the shaft 28 may be held within the bore 26 by any means known in the art.

The hitch ball assembly 10 may include a sensor 30 configured to measure the rotation of the hitch ball 12. The sensor 30 may be configured to monitor the rotational position of the shaft 28 or hitch ball 12 relative to a fixed position, such as relative to the housing 20, or may monitor the absolute rotational position of the shaft 28 or hitch ball 12. The sensor 30 may utilize any appropriate sensing elements, such as mechanical, magnetic, magneto-resistive, torsional, optical, capacitive or inductive sensing elements, or any other sensing elements known in the art.

In an embodiment the sensor 30 may utilize non-contact fixed sensing elements with a rotating actuator. The rotating actuator may be tied to the shaft 28 or other accompanying rotating parts of the sensor 30. The fixed sensing elements may be fixed to any non-rotating part of the hitch ball assembly 10, such as a portion underneath the housing 20 or connected to the housing 20. Alternatively, the sensor 30 may utilize non-contact rotating sensing elements with a fixed actuator. Further, the sensor may employ contacting sensing elements, such as contacting resistive elements with a rotating wiper or fixed wiper.

In an embodiment, the sensor 30 may be a magneto-resistive sensor, such as a KMA200 magneto-resistive sensor. The sensor may comprise an array of magneto-resistive sensing arrays to provide a resolution of 0.05 degrees or better. The high resolution sensor may eliminate the need for additional components in the hitch ball assembly 10. For example, alternative designs utilize lower resolution sensing means that require additional components, such as a gear train, to increase the sensing resolution. By utilizing a high resolution non-contact sensor, the hitch ball assembly eliminates the need for such components.

The sensor 30 may monitor the rotational position of the shaft 28 or hitch ball 12 based on the sensing elements and emit an output signal based on the rotational position. To that end, the sensor 30 may include electronic circuitry to measure, adapt, condition and calibrate the output from the sensing element. The output signal may communicate data, information or values based on voltage, pulse width modulation (PWM), duty cycle, or over network protocols such as CAN, LIN, SPI, I2C BUS Data Link, or using other means of communication.

The sensor 30 may be in communication with components of a towing vehicle or a towed vehicle, such as the vehicle communication bus on the towing vehicle or vehicle communication bus on the towed vehicle, anti-lock braking (ABS) module, engine controller, brake controller, transmission control, or other various components of the towing or towed vehicle. The sensor output signal may be used to sense various conditions of a towed vehicle, such as sway or a jackknife condition. The components of the towing or towed vehicle may then modify and adjust vehicle towing or trailer systems to avoid the unwanted conditions. For example, the towing or towed vehicle may modify the engine or transmission output to alter the speed of the vehicle or gearing, brakes of the towing vehicle or trailer, lights, or any other vehicle systems in response to the input from the sensor 30. In an embodiment, a towing vehicle may include a trailer brake controller configured to receive an input signal from the angle sensor 30. The trailer brake controller may modify the brakes of the trailer based on the angle sensor input signal to reduce unwanted conditions such as sway of the trailer. The angle sensor 30 may also be used to modify other vehicle systems such as back-up assist, park assist and stability control.

In an embodiment, the sensor may be positioned near the bottom of the hitch ball assembly 10, as shown in FIG. 1. For example, the bolt 22 may extend through the threaded opening 24. The sensor 30 may be coupled to the bolt 22 by a threaded nut 32, and may be positioned below the nut 32.

The sensor 30 may comprise a collar 34 and a fixed portion 36. The collar 34 may be connected to the shaft 28 to rotate therewith. For example, the shaft 28 may be keyed 38 to engage a keyed opening 40 in the collar 34. Alternatively, the shaft 28 and collar 34 may be integrally formed. As described above, the collar may include sensing elements 42, such as magnets or the like, to facilitate sensing of rotational position of the shaft 28. The magnets may be positioned within a cavity in the collar 34 an arranged to be 180 degrees apart from one another. The fixed portion 36 may connect to the nut 32 and extend within the collar 34. The fixed portion 36 may include sensing elements and pickups, as well as other electrical circuitry as described above. The hitch ball assembly 10 may further include wires and other components to provide power and communication to and from the sensor 30.

The size and geometry of the ball mount 16 may be configured to provide protection for the sensor 30. For example, as illustrated in FIG. 1, the sensor 30 may protrude below the ball mount 16. The ball mount 16 may include a skirt or guard (not shown) to protect the sensor 30 from any unwanted collisions. The ball mount 16 may further include harnessing or connection points for wires and cables (not shown) to interface with the sensor 30.

In an embodiment illustrated in FIG. 2, the sensor 30 may be mounted above the ball mount 16. For example, the sensor 30 may be a fixed position sensor positioned above the ball mount 16 and inserted within the housing, as shown in FIGS. 2 and 3. The sensor may extend into the bore 26 and below the shaft 28. The sensor may include sensing elements, such as pick ups 44, aligned with a portion of the shaft 28. The sensing elements 44 may interface with a magnet 42 or other sensing elements located on the bottom of the shaft 28.

In use, the hitch ball 12 may be coupled to a trailer hitch coupler. The deformable ring 18 or frictional surface of the hitch ball 12 may allow the ball to rotate with respect to the housing 20 as the trailer coupler rotates. A sensor 30 mounted to the housing 20 may read the rotational position of the shaft 28 or hitch ball 12. The sensor 30 may be mounted under the ball mount 16 and include a rotating collar 34 that interfaces with a fixed portion 36 to read the rotational position. Alternatively, the sensor 30 may be mounted above the ball mount 16 and positioned within the housing 20. The sensor 30 may interface with magnets 42 or other sensing elements positioned at the bottom of the shaft 28. The sensor may read the rotational position of the shaft 28 and emit an output signal based on the position.

Figure 9:
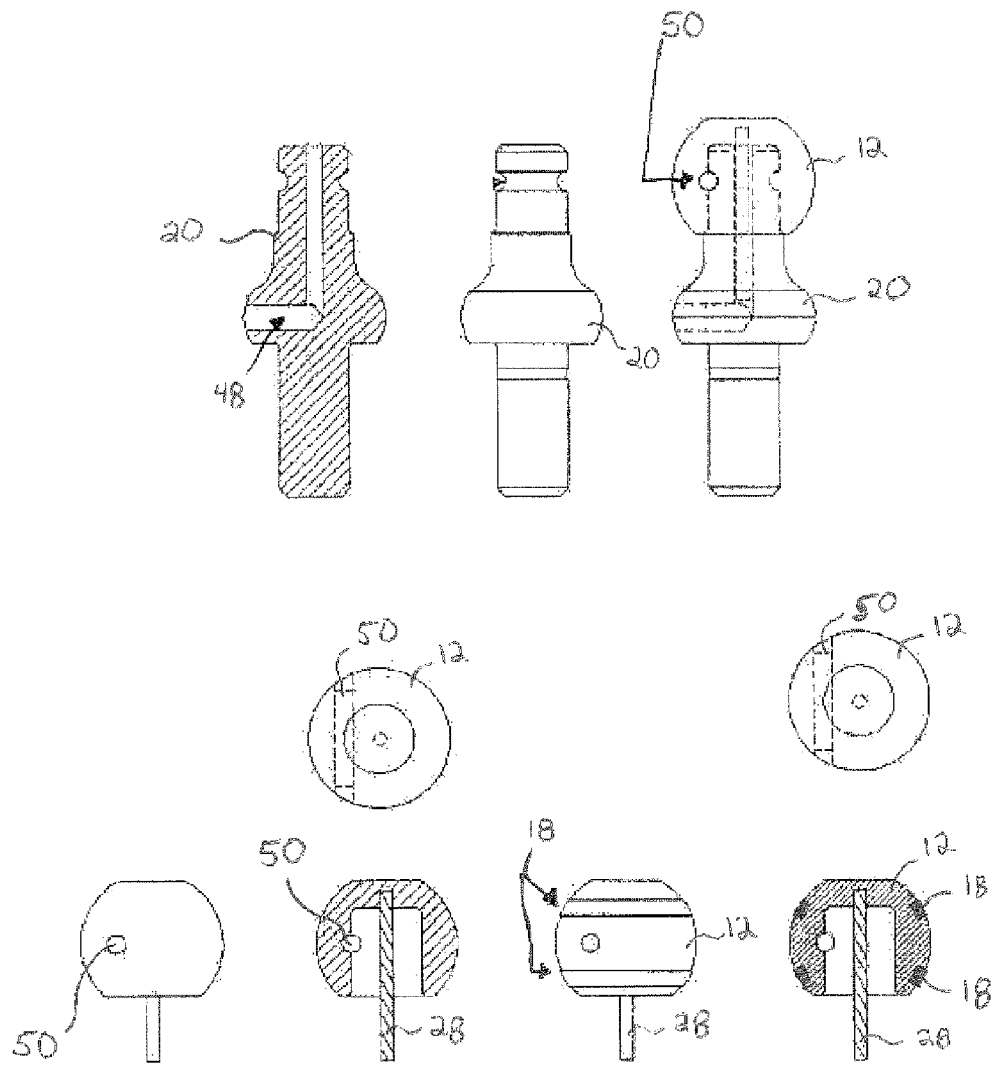
FIG. 9 illustrates a hitch ball with an off-center locator pin hole.

In an embodiment, the sensor 30 may be arranged to engage the side of the housing 20 as shown in FIGS. 8-11. The shaft 28 may include a magnet 42 embedded in or mounted on the shaft 28 to interface with the sensor 30. As seen in the cutaway view of FIG. 8, the shaft 28 may extend through only a portion of the hitch ball 12. The shaft 28 may include a shaft collar 46 or other attachment feature to facilitate engagement with the ball. The attachment feature 46 may allow the hitch ball 12 to be removably attached to the shaft 28 to provide interchangeability of the hitch ball 12. The housing 20 may include an opening 48 to allow the sensor 30 to interface with the shaft 28, such as the side of the shaft. In an embodiment, the opening 48 may be approximately perpendicular to the bore 26 to provide communication between the sensor 30 mounted on the side of the housing 20 and the magnet 42 on the shaft 28. The assembly 10 may further include a mounting pin to connect the hitch ball 12 to the assembly 10. The hitch ball 12 may therefore include a mounting pin hole 50 to receive the mounting pin. As shown in FIG. 9, the mounting pin hole 50 may be located off-center to prevent the mounting pin from interfering with the shaft 28.

Figure 10:
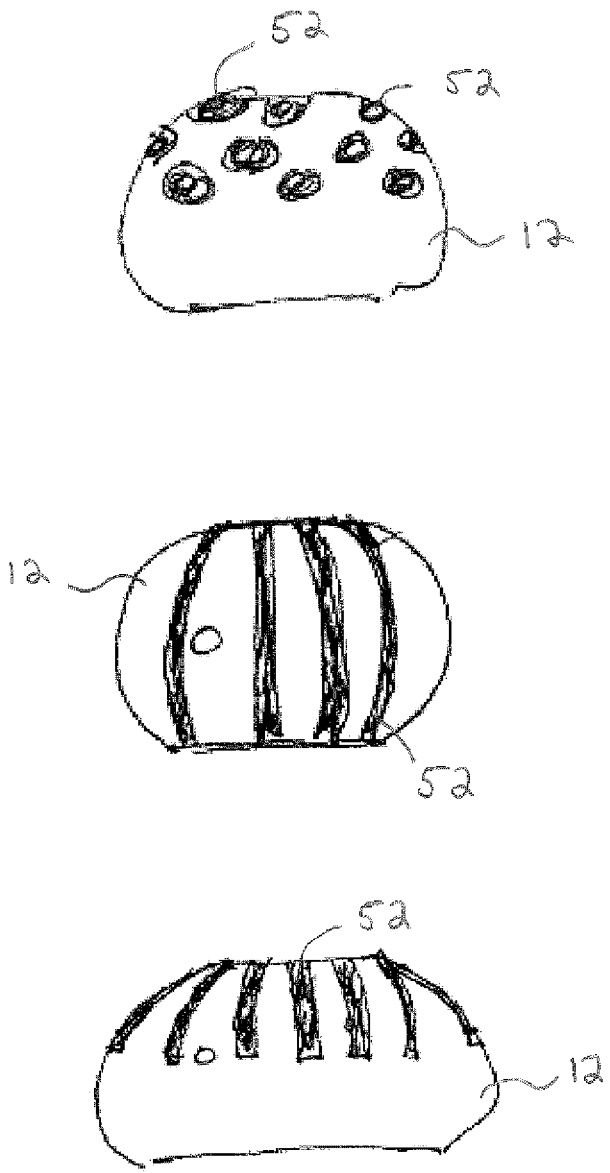
FIG. 10 illustrates various hitch ball attachment feature designs.

The hitch ball 12 may include attachment features in addition to the ring 18 to enhance the connection between the hitch ball 12 and the trailer coupler. For example, as illustrated in FIG. 10, the hitch ball 12 may include one or two rings 18 positioned about the generally spherical hitch ball 12. In an embodiment, a first ring 18 may be positioned about the upper hemisphere of the hitch ball 12 and a second ring 18 may be positioned about the lower hemisphere of the hitch ball 12. This arrangement may improve contact between the rings 18 and the trailer coupler and ensure contact between at least one ring 18 and the coupler at all times. In another embodiment, the hitch ball 12 may include a pattern of deformable material 52 embedded or positioned on the surface of the hitch ball 12. For example, the hitch ball may include a plurality of deformable material spots, a plurality of deformable material line segments, or any other arrangement of deformable material about the surface of the hitch ball 12 to enhance connection between the hitch ball 12 and the trailer coupler.

It will be appreciated that the deformable material 52 may be inserted or molded as convex circular protrusions or similar vertical stripes over either the top or both hemispheres of the hitch ball 12. The protrusions may thus be minimized to avoid snagging the coupler upon removal from the hitch ball engagement.

Figure 12:
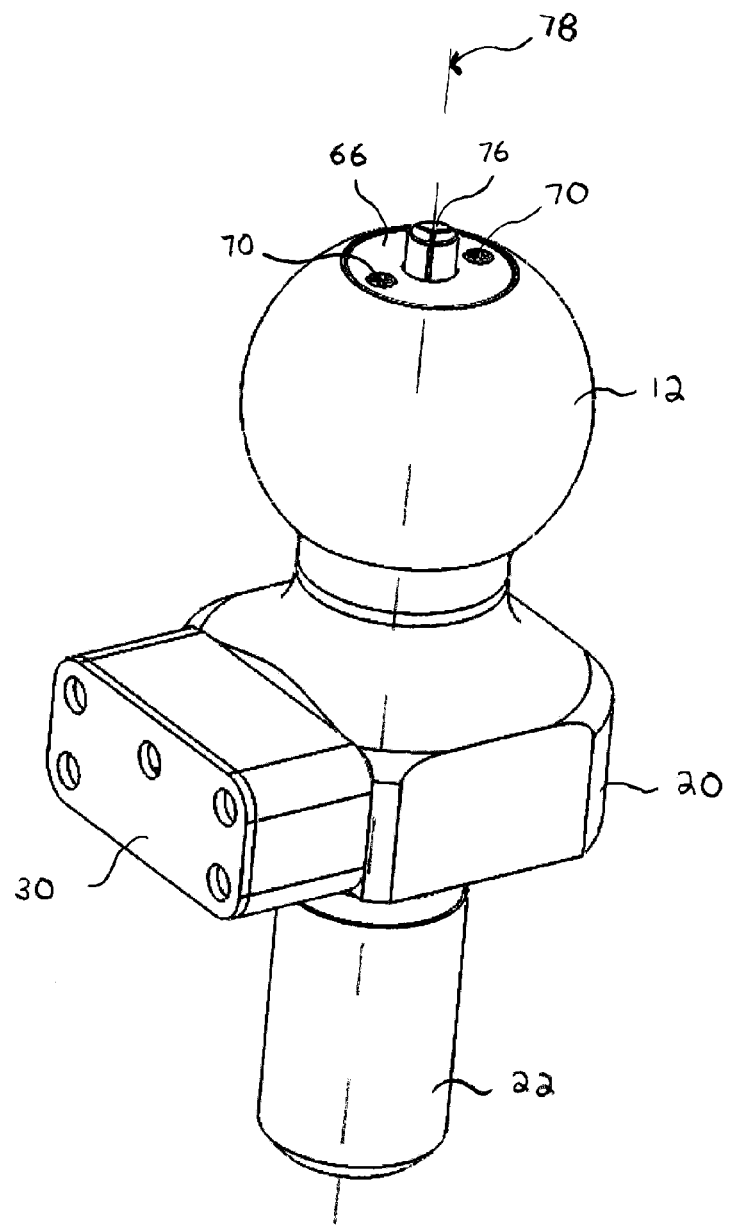
FIG. 12 illustrates a perspective view of a hitch ball assembly having a rotatable pin.
Figure 13:
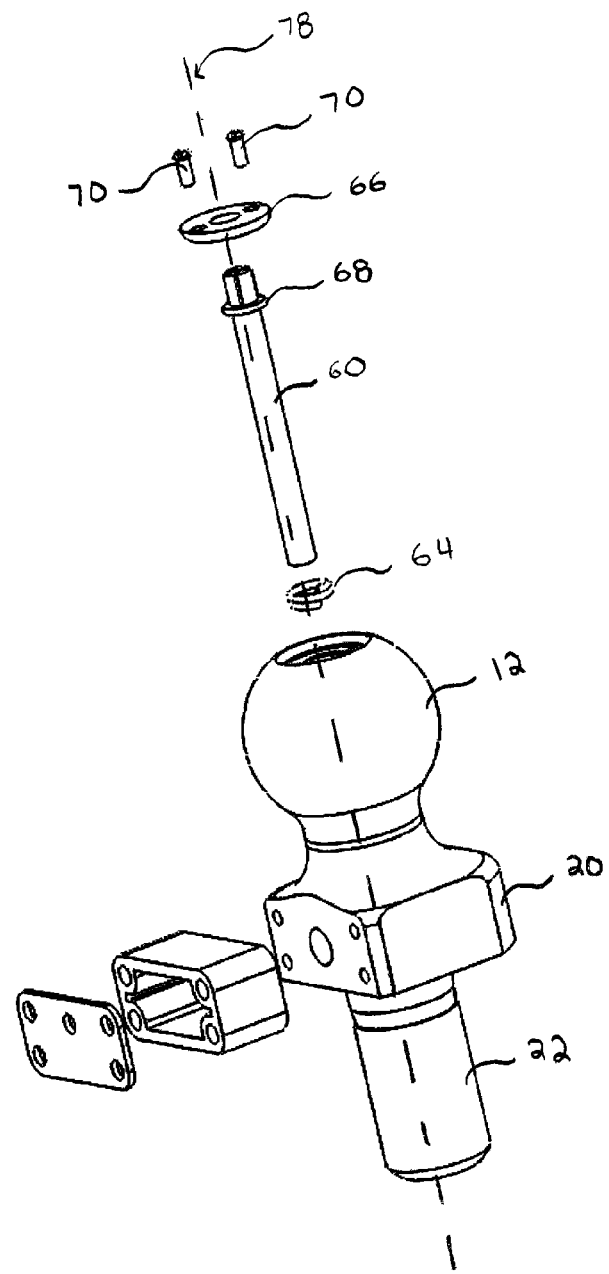
FIG. 13 illustrates an exploded perspective view of a hitch ball assembly having a rotatable pin.
Figure 14:
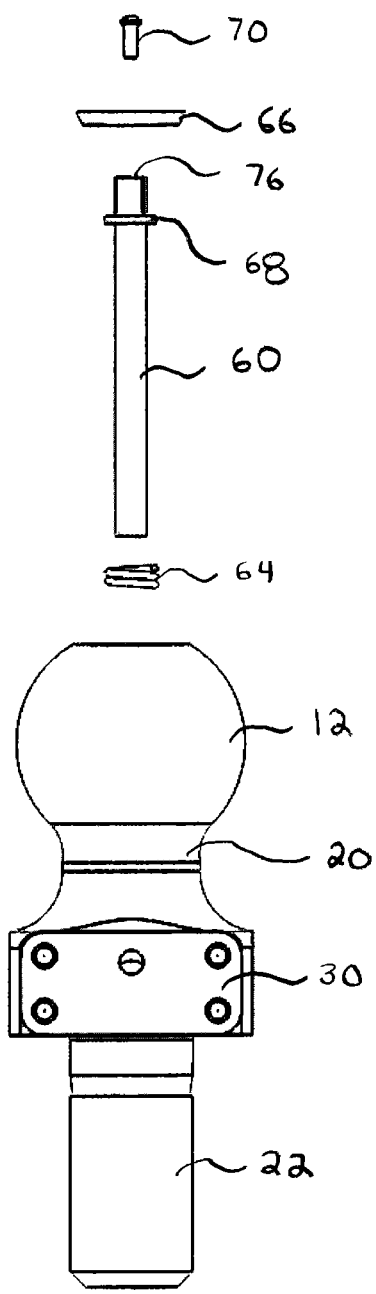
FIG. 14 illustrates an exploded first side view of a hitch ball assembly having a rotatable pin.
Figure 15:
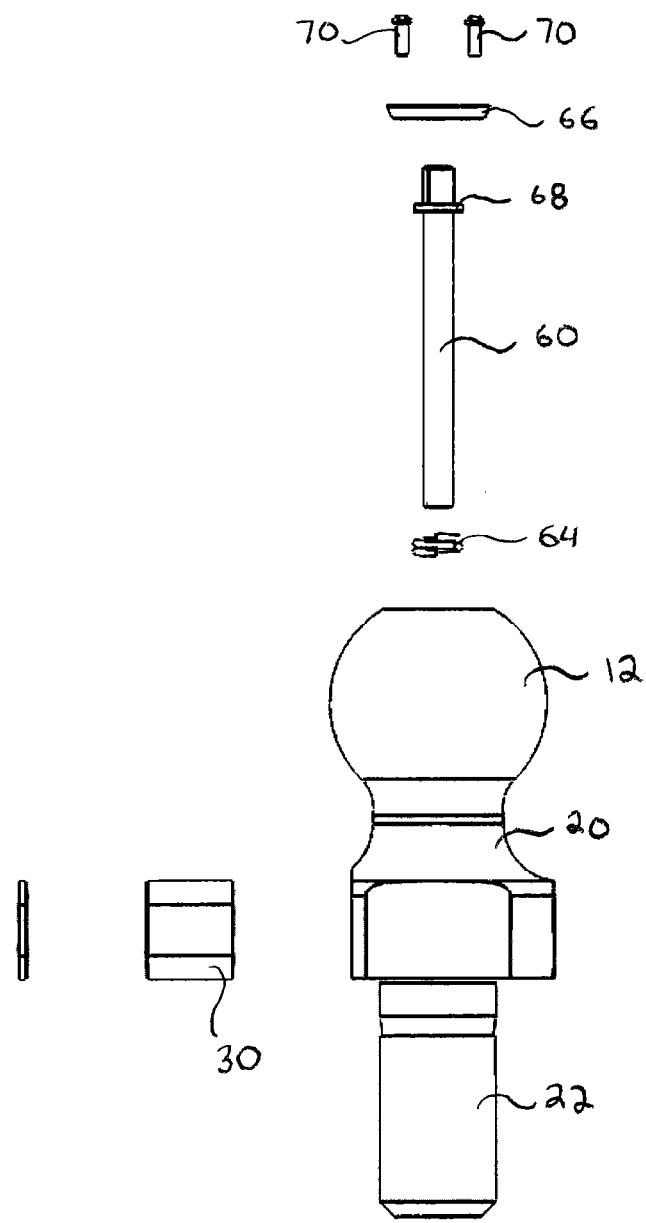
FIG. 15 illustrates an exploded second side view of a hitch ball assembly having a rotatable pin.

In an embodiment, the hitch ball assembly 10 may be configured to reduce the translation of rotational movement to the shaft 28 that results from vertical or non-horizontal rotation of the trailer coupler with respect to the hitch ball 12. For purposes of the current description, the vertical axis and plane will be the axis and plane parallel to the central axis 78 shown in FIGS. 12 and 13. The horizontal axis and plane will be the axis and plane perpendicular to the central axis 78. Vertical or non-horizontal movements of the coupler have a horizontal component that may cause rotation of the hitch ball 12 or shaft 28. By reducing the horizontal component of the movement that is translated to the shaft 28, the sensor 30 may obtain a more accurate reading, even on uneven surfaces and curves, in wind, during quick lane changes, and on roads with potholes.

Figure 11:
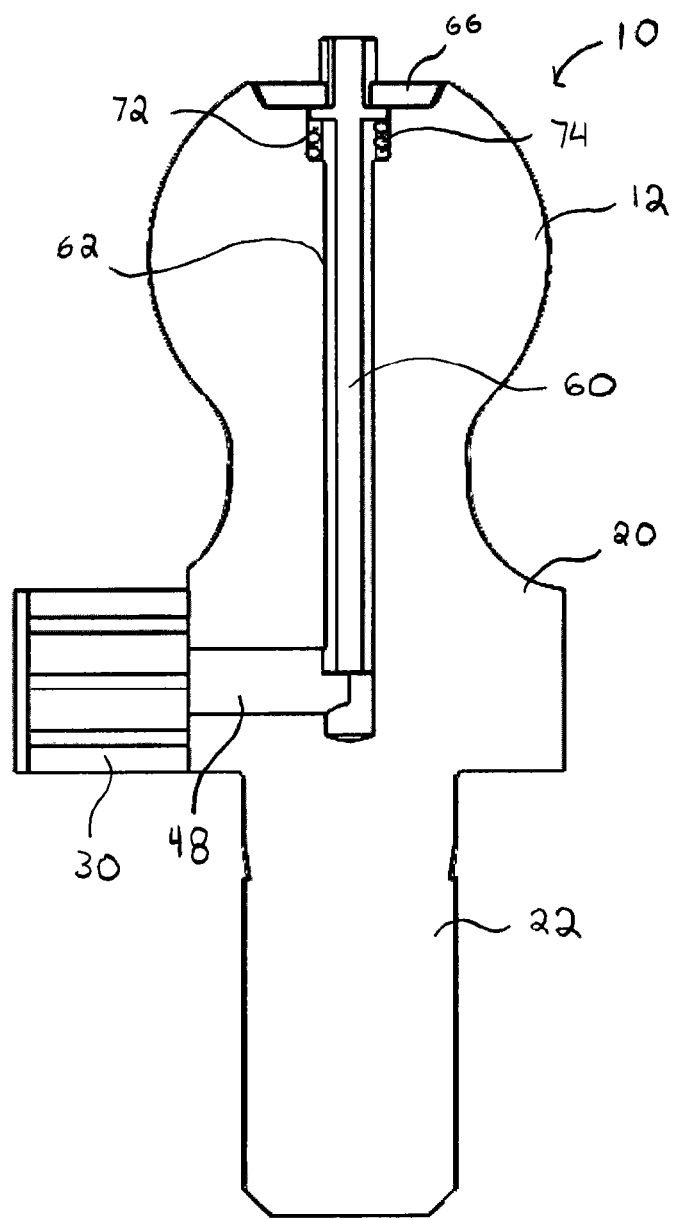
FIG. 11 illustrates a cutaway view of a hitch ball assembly having a rotatable pin.

In an embodiment illustrated in FIGS. 11-15, the hitch ball assembly 10 may include a pin 60 configured to rotate with respect to the hitch ball 12 and directly engage the trailer hitch coupler. The pin 60 may extend through a bore 62 within the hitch ball 12 and the housing 20, as generally shown in FIG. 11. The bore may be generally vertical and approximately aligned with a central axis 78 of the hitch ball assembly 10. The bore 62 may have a circular cross-section, or any other appropriate cross-sectional shape. The bore 62 may extend from a top end of the hitch ball 12 to an internal position inside the housing 20. The bore may intersect the opening 48 to allow the sensor 30 to communicate with and determine the rotation of the pin 60.

The hitch ball 12 may be connected to the housing 20, such as attached to or integrally formed therewith, thus preventing rotation of the hitch ball 12 with respect to the housing 12. The pin 60 may be rotatable within the bore 62 with respect to the hitch ball 12 and the housing 20.

A spring 64 may be positioned between an end of the pin 60 and the bottom of the bore 62. The spring 64 may be configured to bias the pin 60 towards the top of the hitch ball 12 and toward the coupler. The spring 64 may be any appropriate biasing member, such as a coil spring or other biasing member.

The pin 60 may be retained within the hitch ball assembly 10 by a washer 66 and a collar 68. The collar 68 may protrude from a portion of the outer surface of the pin 60. A washer 66 may be secured to the hitch ball 12, such as flush with the outer surface of the hitch ball 12. The washer 66 may be fixed to the hitch ball 12 by one or more bolts or fasteners 70, or by any other appropriate connecting means. The collar 68 may be positioned inside the bore 62 and beneath the washer 66. For example, the hitch ball 12 may include a counterbore 72 formed near the top opening of the bore 62 in the hitch ball 12. The collar 68 may be positioned within the counterbore 72 and travel within the counterbore opening. Thus, the vertical movement of the pin 60 may be restricted to the distance between the washer 66 and the bottom of the counterbore 72.

The collar 68 may be positioned a distance from a tip 76 of the pin 60 to allow a portion of the pin 60 to protrude above the washer 66. The spring 64 may bias the pin 60 to move the tip 76 above the washer 66 and engage the coupler. The hitch ball 12 may include bearings 74 to assist both rotational and vertical movement of the pin within the bore 62. The bearings 74 may be positioned within the counterbore 72 or at any other appropriate location. The rotational resistance of the pin 60 may be varied or increased to reduce the effect of unintentional forces that may cause rotational movement of the pin 60. The pin 60 may extend within the bore 62 all the way to the opening 48 to provide communication with the sensor 30, as described in further detail in the embodiments above.

The tip 76 may be configured to engage the coupler and translate rotational movements of the coupler to the pin 60. For example, the tip 76 may include a gripping or deformable substance, such as rubber or any other appropriate gripping or deformable substance, positioned at the end of the tip 76 to create a frictional engagement between the coupler and the pin 60. The remaining portion of the hitch ball 12, other than the tip 76, may be free of gripping or deformable material to allow the coupler to otherwise move freely with respect to the hitch ball 12. Further, the pin 60 may include a structural feature, such as a protrusion or a key, to engage the coupler and ensure movement therewith. The design of the key will be such that forces in vertical plane applied to the pin 60 will have very minimal forces in the horizontal plane. Only the force in horizontal plane will cause angular rotation of the pin 60.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, we claim:

1. A hitch ball assembly comprising:
   a housing;
   a hitch ball positioned on said housing;
   a bore extending within said hitch ball and said housing;
   a pin positioned within said bore and rotatable with respect to said hitch ball and said housing;
   an angle sensor configured to sense rotation of said pin;
   wherein said pin is configured to engage a trailer coupler and rotate therewith;
   a collar disposed about an exterior surface of said pin; and
   a washer fixed to said hitch ball and configured to retain said pin within said bore.

2. The hitch ball assembly of claim 1, wherein said angle sensor is a non-contact sensor.

3. The hitch ball assembly of claim 1, further comprising a deformable material on a tip of said pin.

4. The hitch ball assembly of claim 3, wherein the deformable material is rubber.

5. The hitch ball assembly of claim 1, further comprising a spring positioned in within said bore and configured to bias said pin towards said coupler.

6. The hitch ball assembly of claim 5, wherein said spring is a coil spring.

7. The hitch ball assembly of claim 1, wherein said housing includes an opening in communication with said bore.

8. The hitch ball assembly of claim 7, wherein said opening is arranged approximately perpendicular to said bore.

9. The hitch ball sensor of claim 8, wherein said angle sensor is positioned in communication with said opening.

10. The hitch ball sensor of claim 1 further comprising one or more magnets positioned on said pin to interface with said angle sensor.

11. The hitch ball assembly of claim 1, further comprising a threaded bolt extending from said housing and connected to a ball mount.

12. The hitch ball assembly of claim 1, wherein said pin is retained within said bore by one or more bearings.

13. The hitch ball assembly of claim 1, wherein said angle sensor comprises a magneto-resistive sensing element.

14. The hitch ball assembly of claim 13, wherein the magneto-resistive sensing element includes an array of magneto-resistive sensing bridges.

15. The hitch ball assembly of claim 1, wherein the angle sensor is configured to provide an input signal to one or more components of a towing vehicle.

16. The hitch ball assembly of claim 15, wherein the towing vehicle is configured to modify at least one of a braking output, an engine control output or an engine transmission output based on the angle sensor signal.

17. The hitch ball assembly of claim 15, wherein the one or more components of a towing vehicle includes a trailer brake controller configured to modify a trailer brake signal based on the angle sensor signal to reduce sway of a trailer.

18. The hitch ball assembly of claim 1, wherein the angle sensor has a resolution of at least 0.05 degrees.

19. The hitch ball assembly of claim 1, wherein said pin is configured to not rotate in response to vertical movements of said coupler with respect to said hitch ball.

* * * * *